United States Patent [19]

Carpenter et al.

[11] Patent Number: 5,003,470
[45] Date of Patent: Mar. 26, 1991

[54] METHOD FOR TYING AND UNTYING PATH ACCESS IN A CPU-BASED, LAYERED COMMUNICATIONS SYSTEM

[75] Inventors: Mark A. Carpenter, Sunnyvale; Steven H. Goldberg, Hillsborough, both of Calif.

[73] Assignee: International Business Machines Corporation, Armonk, N.Y.

[21] Appl. No.: 282,409

[22] Filed: Dec. 9, 1988

[51] Int. Cl.$^5$ .............................................. G06F 7/00
[52] U.S. Cl. ...................................... 364/200; 364/284; 364/240.8; 364/232.3; 364/259.2; 364/259
[58] Field of Search ... 364/200 MS File, 900 MS File, 364/300

[56] References Cited

U.S. PATENT DOCUMENTS

| | | | |
|---|---|---|---|
| 4,479,196 | 10/1984 | Ferrer et al. | 364/900 |
| 4,710,872 | 12/1987 | Scarborough | 364/300 |
| 4,736,369 | 4/1988 | Barzilai et al. | 370/94 |
| 4,833,604 | 5/1989 | Cheng et al. | 364/200 |
| 4,835,709 | 5/1989 | Tsai | 364/513 |
| 4,858,106 | 8/1989 | Mattheyses | 364/200 |

OTHER PUBLICATIONS

Maekawa et al., "Operating Systems-Advanced Concepts", copyright 1987 by Benjamin/Cummings Publishing Co., pp. 177-206.

Primary Examiner—Thomas M. Heckler
Assistant Examiner—Kevin A. Kriess
Attorney, Agent, or Firm—R. Bruce Brodie

[57] ABSTRACT

A method for maintaining the integrity of ties and their associated tie groups in a CPU-based, layered communications subsystem in which the connection endpoints in each layer are denoted by a connection control block (CCB), the relationship between CCBs being denoted by ties. Ties and their CCBs can be mapped onto an edge-oriented graph of tie group relations. The arbitrary removal of an edge (tie) in the graph compromises graph integrity by possible formation of unenumerated subgraphs or independent graphs.

The solution involves enumerating those edges having vertices which no longer reference CCBs within the tie group, removing them, and forming a second tie group. The enumeration is conducted over a Eulerian traverse of the remaining n edges of the graph. A Eulerian traverse of a graph is one which traverses each edge exactly once. Such a traverse reduces the number of comparisons M to a range $N < M < O(N^2)$. This facilitates maintaining either one or two tie groups per cutting of an edge in the graph.

7 Claims, 5 Drawing Sheets

THE TOPOLOGY OF A TIE GROUP

THE TIE GROUP SHOWN IN FIG. 4
WITH ONE EDGE REMOVED

Fig. 1  THE SEVEN-LAYER ISO OSI REFERENCE MODEL (PRIOR ART)

Fig. 2 DATA FORMATS USED IN REFERENCE MODEL (PRIOR ART)

TIE GROUP CATEGORIES

Fig. 3

THE TOPOLOGY OF A TIE GROUP

Fig. 4

| CCB | FIRST ENTRY |
|---|---|
| UCCB 1 | 01 |
| UCCB 2 | 03 |
| UCCB 3 | 02 |
| PCCB A | 03 |
| PCCB B | 05 |
| PCCB C | 01 |

| ENTRY | UCCB | PCCB | NEXTU | NEXTP | PREVU | PREVP |
|---|---|---|---|---|---|---|
| 01 | 1 | C | 05 | 02 | — | — |
| 02 | 3 | C | — | 04 | — | 01 |
| 03 | 2 | A | 04 | — | — | — |
| 04 | 2 | C | — | — | 03 | 02 |
| 05 | 1 | B | — | — | 01 | — |

ADJACENCY MATRIX FOR THE TIE GROUP
SHOWN IN FIG. 4

Fig. 5

| CCB | FIRST ENTRY |
|---|---|
| UCCB 1 | 01 |
| UCCB 2 | 03 |
| UCCB 3 | 06 |
| PCCB A | 06 |
| PCCB B | 05 |
| PCCB C | 01 |

| ENTRY | UCCB | PCCB | NEXTU | NEXTP | PREVU | PREVP |
|---|---|---|---|---|---|---|
| 01 | 1 | C | 05 | 02 | — | — |
| 02 | 3 | C | — | 04 | 06 | 01 |
| 03 | 2 | A | 04 | — | — | 06 |
| 04 | 2 | C | — | — | 03 | 02 |
| 05 | 1 | B | — | — | 01 | — |
| 06 | 3 | A | 02 | 03 | — | — |

THE MATRIX OF FIG. 5 MODIFIED
BY A TIE OPERATION

Fig. 6

| CCB | FIRST ENTRY |
|---|---|
| UCCB 1 | 01 |
| UCCB 2 | 04 |
| UCCB 3 | 06 |
| PCCB A | 06 |
| PCCB B | 05 |
| PCCB C | 01 |

| ENTRY | UCCB | PCCB | NEXTU | NEXTP | PREVU | PREVP |
|---|---|---|---|---|---|---|
| 01 | 1 | C | 05 | 02 | — | — |
| 02 | 3 | C | — | 04 | 06 | 01 |
| 04 | 2 | C | — | — | — | 02 |
| 05 | 1 | B | — | — | 01 | — |
| 06 | 3 | A | 02 | — | — | — |

THE MATRIX OF FIG. 5 AS MODIFIED
BY THE UNTIE OPERATION

Fig. 7

THE TIE GROUP SHOWN IN FIG. 4
WITH ONE EDGE REMOVED

Fig. 8

METHOD FOR TYING AND UNTYING PATH ACCESS IN A CPU-BASED, LAYERED COMMUNICATIONS SYSTEM

FIELD OF THE INVENTION

This invention relates to a CPU having a hierarchically layered communications subsystem utilizing the open system interconnection (OSI) model. More particularly, the invention relates to a method within the CPU host for maintaining the integrity of a path among the connection control block manifestations of the OSI layers in the presence of path disruptions.

DESCRIPTION OF RELATED ART

Maekawa et al., "Operating Systems-Advanced Concepts", copyright 1987 by The Benjamin/Cummings Publishing Co., pp. 177-206, define a distributed system as a collection of independent computers and a communication facility therebetween for exchanging messages. Significantly, such systems do not utilize shared memory. Rather, they must rely upon message passing as the basis for distributed synchronization.

When computers or processes communicate by exchanging messages, there must be a set of established rules or protocols to govern the manner in which communication is allowed to take place. As Maekawa points out, various levels of protocols are required, for instance, to ensure that buffer capacities are not exceeded and that messages are not lost.

Reference should be made to the ISO International Standard 7498 relating to a model of Open Systems Interconnection (OSI) architecture. According to the Standard, an "open system" represents a network as a hierarchical structure of "layers" of functions, each "layer" providing a collection of related functions that can be accessed and used by the "layer" above it in the hierarchy. Also, an "open systems interconnection" refers to a set of protocols used for communications between two or more open systems.

The ISO standard OSI model delineates seven layers. These include from top to bottom (7) an application layer, (6) a presentation layer, (5) a session layer, (4) a transport layer, (3) a network layer, (2) a data-link layer, and (1) a physical layer.

It is usual for some of the layers to be combined or eliminated as a function of the application served. For example, layers (1)-(3) can be folded into a communications layer including the transmission of raw bit streams, the electrical cooperation between send and receive points, automatic error detection and recovery, and any packet and routing management requirements. Also, layers (6)-(7) may be folded together as a single applications layer in that they focus on the presentation and use of information. The functions of the session and transport layers are to provide connections (sessions) between specific pairs of processes (one in each layered subsystem) on one hand, and reliable host CPU-to-CPU communications on the other hand. Relatedly, the communications layer is usually implemented in hardware, whereas the application and intermediate layers, as now defined, are software implemented.

OSI, as a multiple layer architecture, establishes reliable communications among processes and guarantees that messages are received in the same order in which they are sent. In OSI, each layer may be viewed as a service provider. That is, it provides services to the layer, or user above it, in order to allow that user to communicate with its peer at another node. A layer provides these services by establishing a connection with the next lower layer in the hierarchy until it reaches the bottom or physical communication layer. At this point, a message is impressed upon the physical path to its destination. At the destination node, the same process is repeated but in inverse order.

The passage of messages vertically down the layers at an originating host, the transmission horizontally over the physical path or layer to the target, and the vertical processing up the target host are well described in the prior art. Most of the problems addressed by the prior art have been of the communications variety emphasizing the horizontal or peer-coupled aspects. These include the establishment of a session, routing, and maintaining synchronization in the presence of noise or variable bandwidth. Illustratively, reference should be made to Barzilai et al., U. S. Pat. No. 4,736,369, "Adaptive Session-level Pacing", issued Apr. 5, 1988.

SUMMARY OF THE INVENTION

It should be appreciated that the prior art does not treat the problem of maintaining the integrity of the layered processing within a CPU host, particularly the vertical aspect. That is, the process path through the layers is subject to change as a function of path establishment and takedown.

It is accordingly an object of the invention to provide a method for managing a CPU host having a layered communications subsystem such that the system can make readjustments in processing in the presence of path disruption.

In order to focus the objects more specifically, it should be recalled that a "control block" is a construct used to define a connection control state. Since each layer in the communications comprises a bevy of functions, the interrelations among the layers is defined by way of the connections among counterpart control blocks. These are denominated "connection control blocks" (CCBs). The relationship between CCBs is termed a "tie", and a defined set of tied CCBs is called a "tie group". The creation of a "tie" permits serialization of work over all CCBs tied together within the same layer when running in an environment.

It is accordingly another object of this invention to devise a method for maintaining tie group integrity within each layer of a CPU-based, layered communications subsystem.

It was unexpectedly observed that the ties and their CCBs could be mapped onto an edge-oriented graph of tie group relations. However, in the event that one of the edges (ties) were to be removed through connection termination, fault, or error, then graph integrity would be compromised through the formation of unenumerated subgraphs or independent graphs.

The method of the invention involves processing the graph by enumerating those edges having vertices which no longer reference CCBs within the tie group, removing them, and forming a second tie group. The enumeration is conducted over a Eulerian traverse of the remaining n edges of the graph. Parenthetically, a Eulerian traverse of a graph is one which traverses each edge exactly once. Such a traverse reduces the number of comparisons m to a range $N < M < O(N^2)$. This facilitates maintaining either one or two tie groups per cutting of an edge in the graph.

If the form of enumeration required a traverse by way of a recursive path (depth first) of a node-oriented graph, then $O(N^2)$ comparisons would be required.

More particularly, the above objects are satisfied by a computer-implemented method for maintaining the integrity of ties connecting control blocks (CCBs) within each layer of a layered communication subsystem, a "tie group" being a set of tied CCBs. Each layer, manifest as a callable subroutine, provides a unique set of functions for establishing an association between counterpart connection endpoints. Furthermore, each layer includes at least one CCB representing a subset of the connection endpoints in that layer. The method steps comprise (a) dynamically inserting tie relationships into an edge-oriented graph representation of a current tie group; (b) serially processing the layer-invoking primitives for those CCBs which are members of the current tie group; (c) responsive to the arbitrary removal of a given edge (tie), traversing a path through the graph and removing those remaining edges which do not exhibit at least one vertex referencing the current tie group; and (d) forming another tie group from the CCBs referenced in the vertices of the removed edges (ties).

It should be noted that the path traversed according to step (c) is one selected from the set consisting of a Eulerian traverse and a depth-first traverse. Also, each tie among CCBs is selected from the set consisting of one to one, one to many, many to one, and many to many.

DESCRIPTION OF THE PREFERRED EMBODIMENT

The ISO OSI Reference Model

Figure 1:
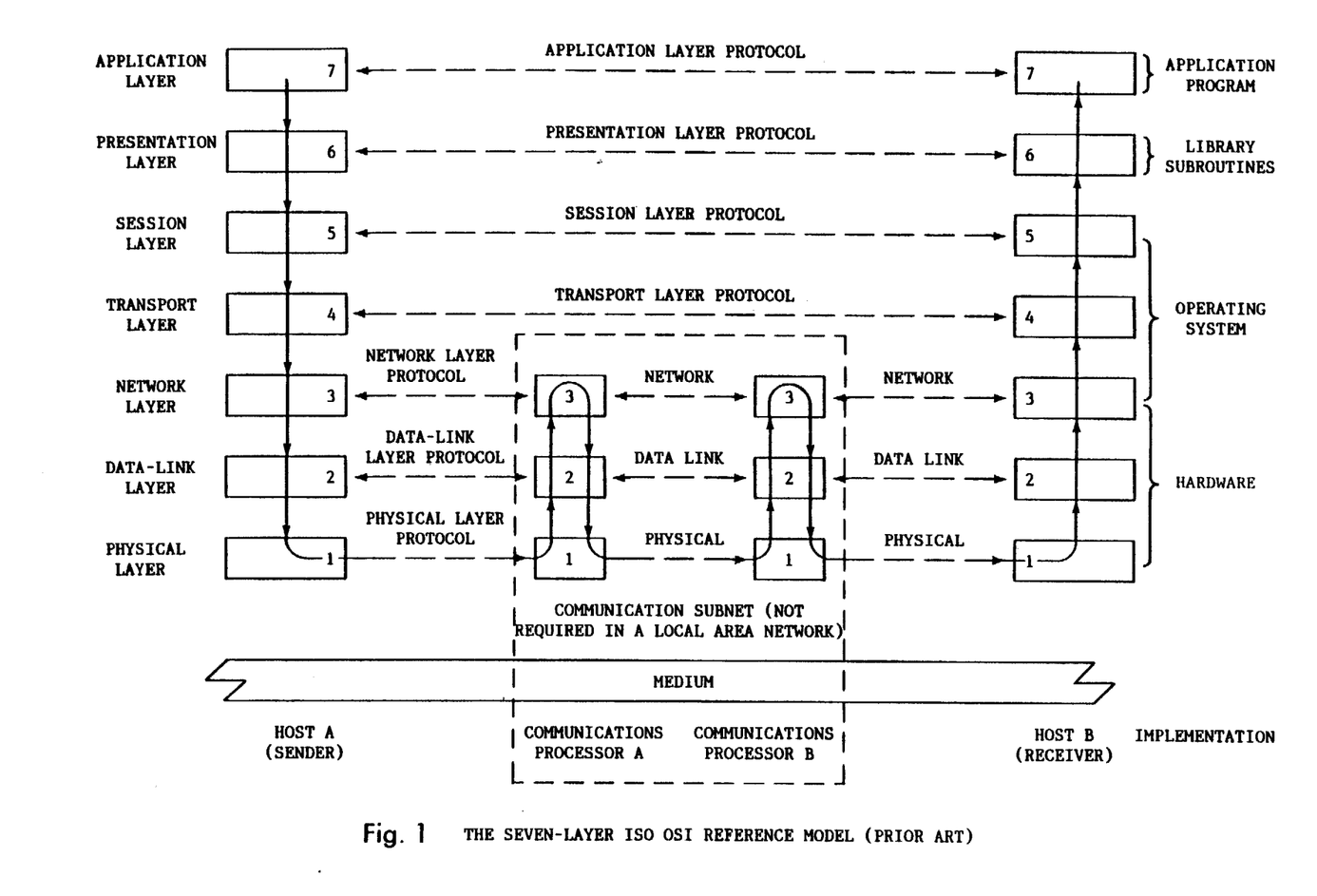
FIG. 1 (prior art) refers to a modified multiple layer ISO OSI Reference Model emphasizing the vertical movement of message processing within a host and the horizontal movement between hosts.

Referring now to FIG. 1, there is shown a seven-layer ISO OSI Reference Model. As previously mentioned, several of the layers can be banded together without violating the principle of layered communications. That principle is that each layer constitutes a set of functions invoked by so-called primitives which are executable independent of other layers, although they are run in a predetermined order. Some of the functions may invoke functions residing in adjacent layers. That is, a function at layer N may call a function in layer N-1. The interface between two layers can be mandated through a service access point. In this regard, a lower layer conceptually is the service provider to a higher layer. From the lower layer's perspective, the higher layer is the service user.

OSI Layers and Message Processing

Figure 2:
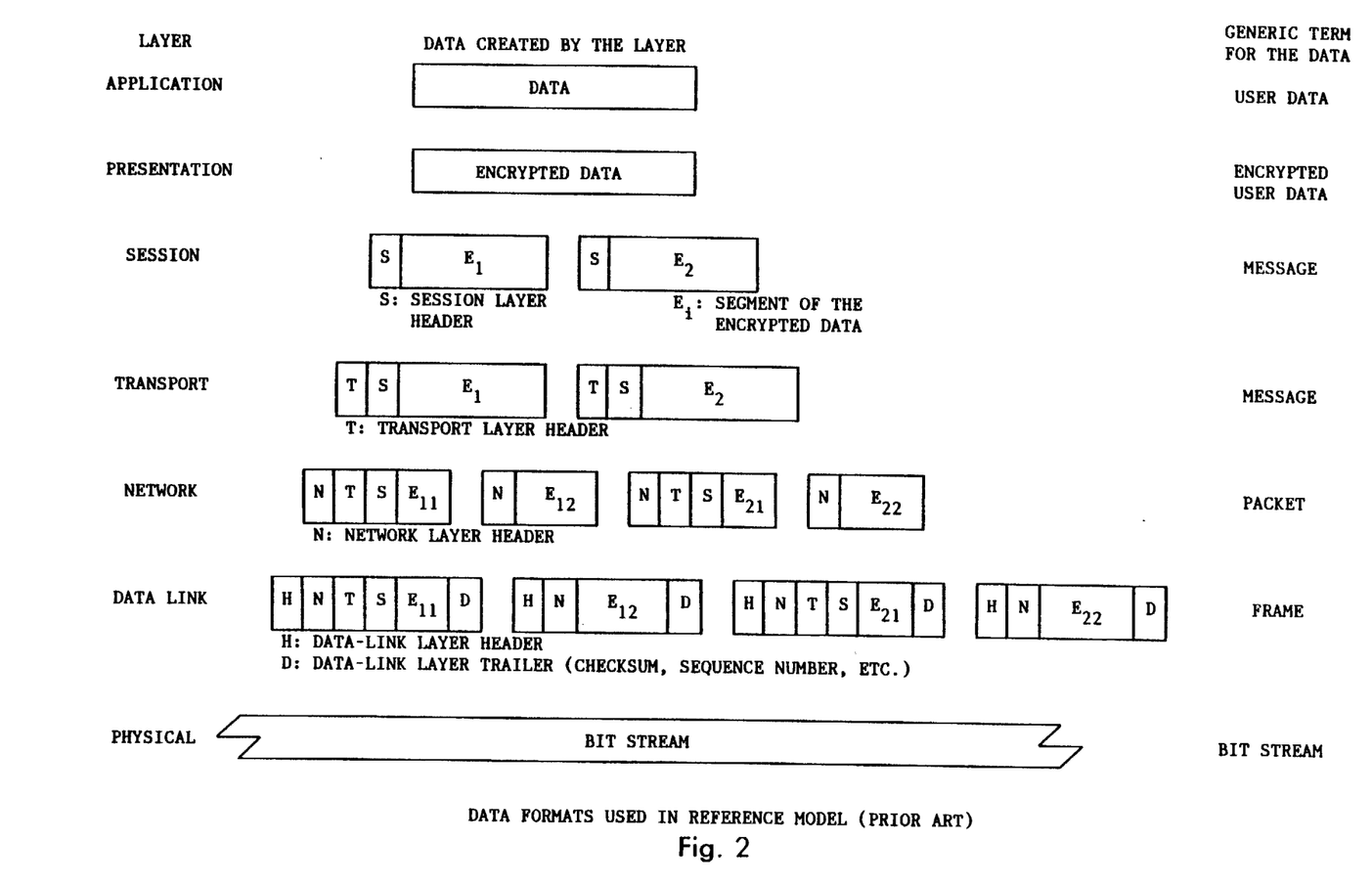
FIG. 2 (prior art) sets out a base message or data generated by an application layer and the modifications made as the intermediate layer and communication layer make thereto prior to transmission.

Referring now to FIG. 2, there is shown an illustrative data structure and the modifications thereto made by the functions in various layers as the action passes vertically down from the application layer through the physical layer. In this regard, the application and presentation layers define user-to-user communication (interuser communications protocol); the session and transport layers define process-to-process communication (interprocess communications protocol); and the network, data-link, and physical layers define the actual data transmission (intercomputer communications protocol).

Illustratively, suppose CPU A desired to send a message M to CPU B over the OSI system having three layers; namely, an application layer, an intermediate layer, and a communications layer. As each process constituting a successive layer is called, it operates upon the message. Thus, for a message M generated by the application layer, the intermediate layer alters the message to become k1(M). Next, the communications device layer, in turn, modifies the result to become k2(k1(M)). The composite message is sent over the network and is received by destination CPU B as k2(k1(M)). Since the composite is decomposed in inverse layer order, arguably it may be said that each layer communicates with its peer. Thus, intermediate layer A sends the message k1(M) to intermediate layer B, while the application layer at CPU B is the only layer in receipt of the pristine original message M.

Connections, Control Blocks, and Layers

To perform meaningful work, the user at one endpoint will establish a "connection" with a target endpoint. The action will follow a path through the appropriate layers which provide the necessary services to the calling or invoking user. A construct termed a "connection control block" (CCB) represents a portion of the total connection between the endpoints in the two systems when one layer requires the services of another layer. This means that a CCB exists at each layer-to-layer boundary, and the "connection" within each system is defined by the chain of related CCBs.

The Operating System Environment for OSI-based Communications Subsystem

The communications subsystem provides a runtime environment in which the functions constituting the layers perform in a manner consistent with a finite state machine. That is, a typical layer associates a state transition table and the current state of the connection with each CCB. When a layer is invoked to perform a unit of work for a particular connection (in this sense, each request for a layer to provide a service is considered a unit of work), it will take the current state, work request input, and state transition table to find the software to process the request. The execution of the ascertained software changes the state of the connection and the layer, and may produce an output.

Each request for a layer to provide a service is considered a unit of work. As previously mentioned, a layer comprises a set of related callable functions. Thus, the communications subsystem will invoke the layer responsive to the request and return from it when the associated process or function is completed. Each request of a unit of work is associated with a particular CCB.

In the event that a layer currently executing calls one function resident in another layer, then that request or call is scheduled to be run next. It is imperative that all requests issued for the same CCB (layer) be executed in the order issued. A "thread" is a sequence of related requests performed in a synchronous manner. All requests subsequent to an original generating request execute on the same thread. Juggling multiple threads and assigning them to tasks is the responsibility of the communications subsystem. The allocation and scheduling of computing resources among multiple tasks are functions of the operating system and is beyond the scope of this invention.

Ties and Tie Group Categories

As may be recalled, the relationship between CCBs is termed a "tie", and a defined set of tied CCBs is called a "tie group". The creation of a "tie" permits serialization of work over all CCBs tied together within the same layer when running in a CPU environment. Now, the abstract representation of a tie group is an edge-oriented, undirected graph wherein the CCBs serve as nodes and the ties serve as edges.

Figure 3:
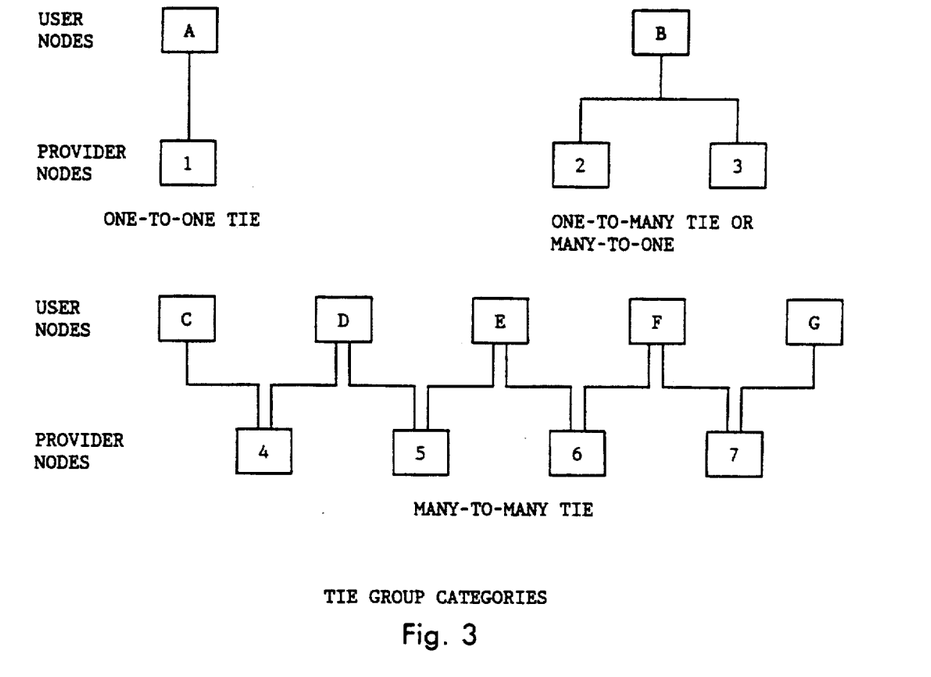
FIG. 3 shows an abstract representation of tie group categories as used by the invention.

Referring now to FIG. 3, there are shown abstract representations of tie group categories as used by the invention. In this invention, it is stipulated that ties can only be made between a CCB representing the connection between the ith layer and the ith +1 layer above it. The i+1 layer is designated as the user layer (UCCB), while the i layer provides the services (PCCB). Relatedly, the tie relationships are selected from the set consisting of one to one, one to many, many to one, and many to many. This corresponds to a single CCB tied to one other CCB, one CCB tied to many CCBs, many CCBs tied to a single CCB, and many CCBs tied to many other CCBs.

With reference to FIG. 3, it should be apparent that the set of edges and the tie group category should be as follows:

| Set of Edges | Tie Group |
| --- | --- |
| {(A,1)} | One to One |
| {(B,2),(B,3)} | One to Many |
| {(2,B),(3,B)} | Many to One |
| {(C,4),(D,4),(D,5),(E,5) (E,6),(F,6),(F,7),(G,7)} | Many to Many |

The Tie Operation

Figure 4:
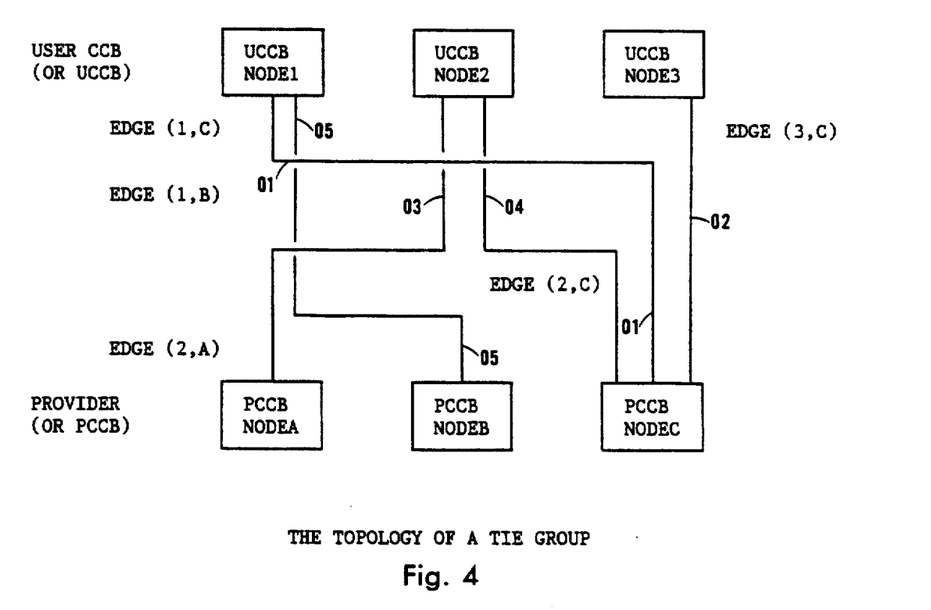
FIG. 4 sets out the topology of a tie group used with the illustrative example in the preferred embodiment of the invention.

Referring now to FIG. 4, there is shown the topology of a tie group used with the illustrative example in the preferred embodiment of the invention. The graph comprises upper-layer and lower-layer CCBs as nodes and are designated as user CCBs (UCCBs) and provider CCBs (PCCBs), respectively, and the tie relations as edges (1,C), (2,A), etc.

Figure 5:
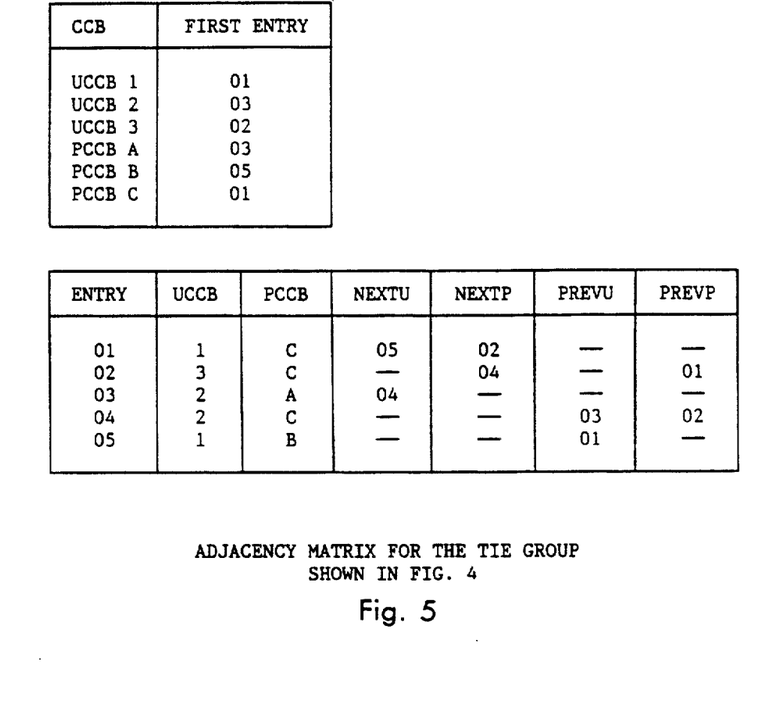
FIG. 5 depicts the adjacency/multiplicity matrix for the tie group graph shown in FIG. 4.

Referring now to FIG. 5, there is depicted the adjacency matrix for the tie group graph shown in FIG. 4.

For each edge entry in the list, there is a corresponding entry for the next like-side entry in the list. That is, the first reference for node 1 (edge 1,C) has a Uside reference to the fifth entry in the list. The next Pside reference (for node C) is the second entry in the list.

As CCBs are tied together, more entries are added to the list. Each CCB in the tie group references its first tie edge in the list. For the list shown in FIG. 5, UCCB 1's first entry is 01, UCCB 2's first entry is 03, PCCB A's first entry is 03, etc. Consequently, the operation for tying a pair of CCBs together requires (1) adding the edge to the list, and (2) making this new entry the first entry for the affected CCBs.

Figure 6:
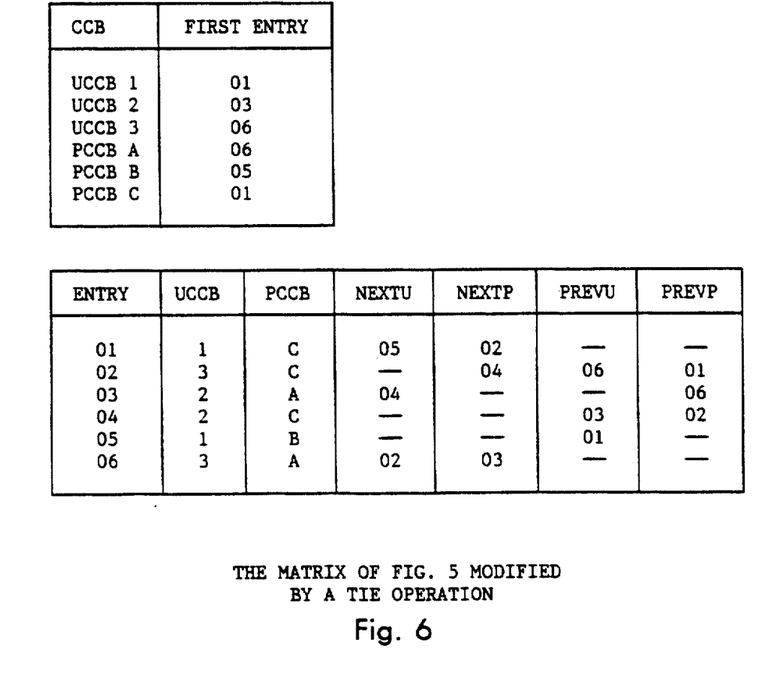
FIGS. 6 and 7 refer to the matrices of FIG. 5 as respectively modified by a TIE and an UNTIE operation.

Referring now to FIG. 6, there is shown the matrix of FIG. 5 as modified by the TIE operation. Note, the modifications made to FIG. 5 and appearing in FIG. 6 are set out step for step in the following paragraph.

Illustratively, supposing it was desired to tie UCCB 3 to PCCB A, the steps would include:

(1) Add the edge (3,A) to the list as entry 06.

(2) The next entry number (NextU) is that entry number having the same UCCB node designation (UCCB 3). This turns out to be entry 02. Note, this was UCCB 3's first entry.

(3) The next entry number (NextP) is that entry number having the same PCCB node designation (PCCB A). This corresponds to entry 03. Note, this was PCCB A's first entry.

(4) Amend UCCB 3's first entry to become 06.

(5) Amend PCCB A's first entry to become 06.

The foregoing algorithm is operative irrespective of whether two CCBs to be tied already belong to the same tie group. Indeed, it may well be the case that tying two CCBs together may cause two tie groups to be joined.

The Untie Operation

Untying CCBs is the inverse of the tie operation. In order to perfect an untie, it is necessary to break an edge. The operative steps include (1) removing the pertinent entry from the list, and (2) making an appropriate backward reference to each side CCB reference of the edge's previous entry.

Illustratively, it is desired to untie CCBs 2 and A:

(1) Remove entry 03 from the list.

(2) Entry 04 becomes the last entry for UCCB 2.

(3) Entry 06 becomes the last entry for PCCB A.

(4) UCCB 2's first entry becomes 04.

Figure 7:
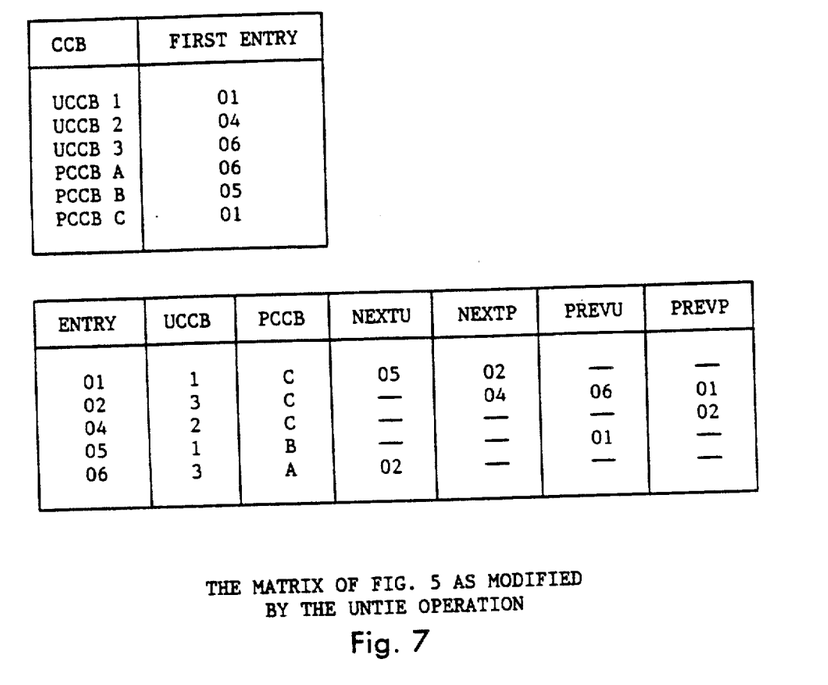

Referring now to FIG. 7, there is set out a list representation of the graph revised as a consequence of the untie operation on edge (2,A). In this regard, in order to ascertain the identity of CCBs tied to any given CCB, it is only necessary to identify the first entry associated with the given CCB and then follow the chain.

Typing and Untying in Many-to-Many Tie Groups

The tie group construct is used to serialize access to layer services and resources. The removal of a single edge in many-to-many tie groups may create two distinct groups. It may also result in an ambiguity as to whether tie groups are in fact independent and distinct. The first problem is that of detecting the existence of two or more tie groups. This is tantamount to traversing the graph in a systematic way, marking each node visited, and upon completion of the traverse ascertaining which nodes were not traversed. One prior art method involves a recursive, depth-first search or traverse. However, such traverse requires $O(N^2)$ comparisons.

The following is directed to applying a Eulerian traverse to the edge-oriented, many-to-many tie group representation according to the method of this invention.

Figure 8:
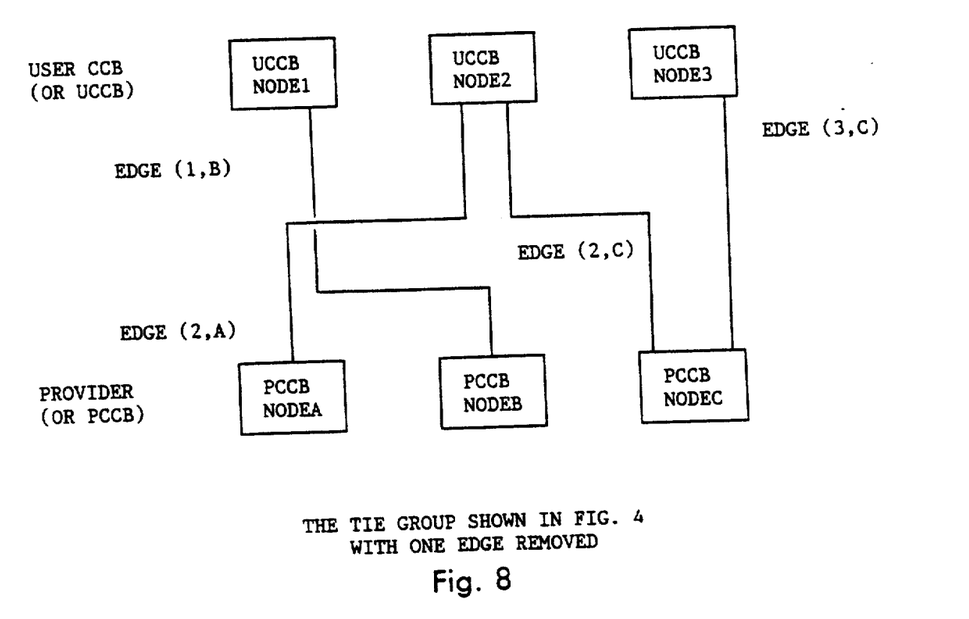
FIG. 8 shows the tie group depicted in FIG. 4 with at least one edge removed.

Referring now to FIG. 8, there is shown the same tie group as in FIG. 4, except for the removal of the edge (1,C). The following measures or steps should be used according to the invention to ascertain whether two tie groups are extant:

(1) Take entry (1,C) out of the original tie group list and adjust CCB 1 and CCB C as appropriate.

(2) Take the second entry in the list, edge (3,C), and make it the first entry in a new tie group list.

(3) Move all like sides (connected to vertices 3 or C) of this edge over to the new tie group list.

(4) Return to the modified original list and, in the event that the next entry in the modified original list matches any entry in the new list, move it over to the new list.

(5) Move all of its like PCCB sides (all edges with a vertex equal to the PCCB) over to the new tie group.

(6) Repeat steps (4) and (5) until the end of the original list is reached.

A match between the old and new lists is detected by virtue of the fact that each CCB also references the control block owning the tie group list. When a CCB is moved to the new list, its tie group block reference is adjusted. Thus, each CCB in the old list referencing the new list should be moved.

The Pseudocode Expression of the Embodiment of the Method

The following Tables 1-3 set out a PASCAL-like pseudocode rendition of tie and untie algorithms embodying the method of the invention. In this regard, Table 1 defines such constructs as the CCBs, tie group control blocks, edge control blocks, etc. Table 2 recites the TIE procedure. Significantly, Table 3 sets out the UNTIE procedure, which includes the procedures for testing to ascertain whether a graph has two or more tie groups. Each of the procedures and functions is heavily commented such that the flow of control is readily apparent therefrom.

We claim:

1. A computer implemented method for maintaining the integrity of ties connecting control blocks (CCB's) within each layer of a computer based layered communication subsystems, each tie connoting a correspondence relationship between a pair of CCB's, a "tie group" being a set of tied CCB's, each layer being manifest as a callable subroutine which when invoked by said computer according to a predetermined progression of layer invocations provides a unique set of functions for establishing an association between counterpart connection endpoints, each layer including at least one CCB representing a subset of the connection end points in that layer, comprising the steps of:
(a) dynamically inserting tie relationships into a labelled edge oriented graph representation of a current tie group, the vertices of the graph being the CCB's with each edge being identified by a pair of labelled vertices;
(b) serially processing selected ones of the unique set of functions for those CCB's that are members of the current tie group, the current tie group being the tie group associated with the invoked layers;
(c) responsive to an arbitrary removal of a given edge representation of a tie in the graph such as occasioned by way of layer connection termination, fault, or error prospectively comprising graph integrity by formation of unenumerated sub-graphs or independent graphs, traversing a path through the graph, evaluating and removing each traversed edge that does not exhibit at least one labelled vertex referencing the current tie group; and
(d) forming another tie group from the CCB's referenced in the labelled vertices of the removed the edges (ties).

2. The method according to claim 1, in which the path traversed according to step (c) is one selected from the set consisting of an Eulerean traverse and a depth first traverse, an Eulerian traverse of a graph denoting a path in which each edge is traversed exactly once.

3. The method according to claim 1, in which in step (c) the number M of evaluations of N edges, if the path traversed is Eulerian, lies in the range [N*log(N)<M<O(N 2)] N<M<O(N^2).

4. The method according to claim 1, wherein each tie group among CCBs is selected from the set consisting of on-to-one, one-to-many, many-to-one, and many-to-many tie groups.

5. A computer implemented method for maintaining the integrity of ties and their associated tie groups in a CPU based layered communications sub-system, each layer, manifest as a callable sub-routine, providing a unique set of functions for establishing an association between counterpart connection endpoints, each layer including at least one control block (CCB) representing a subset of the connection endpoints in that layer, a "service request" being an externally supplied construct for invoking the process associated with a given layer and parameterizing it with designated one of the CCB's in that layer, a "thread" being a sequence of related service requests executed synchronously across counterpart CCB'S, a "tie" being a connection between CCB's in the same layer, a "tie group" being a set of tied CCB's, only one thread executing per tie group at a time, comprising the steps of:
(a) dynamically inserting tie relationships into an edge oriented graph representation of a current tie group;
(b) serially processing the service requests for those CCB's that are members of the current tie group;
(c) ascertaining the "ties" among the CCB's that are members of said current tie group during **a Eulerian path traverse through the graph, an Eulerian traverse of a graph denoting a path in which each edge is traversed exactly once; and
(d) removing a tie (edge between control blocks) from the graph if the edge being traversed lacks at least one vertex referencing the current tie group, and creating a second tie group from the removed ties or edges.

6. A computer implemented method for maintaining the integrity of ties and their associated tie groups in a computer invocable hierarchically layered communications sub-system, each layer including a different callable set of related message and path processing subroutines according to the position of the layer within the hierarchy, each layer when invoked by said computer including a connection control block (CCB) denoting connection end points in the layer, each tie connoting a correspondence relationship between a pair of CCB's, a defined set of tied CCB's being denominated a tie group, comprising the steps of:
(a) mapping the ties and their CCB's onto an information construct forming the edge oriented graph of tie group relations, the vertices denoting the CCB's and the edges denoting the ties, arbitrary removal of an edge representation of a tie in the graph such as by way of layer connection termination, fault, or error prospectively compromising graph integrity by formation of unenumerated sub-graphs or independent graphs; and (b) enumerating those edges having vertices which no longer reference CCB's within the tie group, removing them, and forming a second tie group from the removed edges, the enumeration being conducted over an Eulerian traverse of the graph.

7. The method according to claim 6, in which an Eulerian traverse of a graph denotes a path in which each edge is traversed exactly once.

* * * * *